Figure 1:
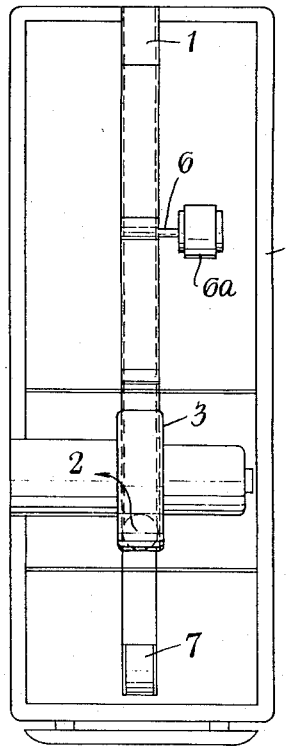

Oct. 3, 1961     F. MAYER     3,003,063
APPARATUS FOR MEASURING RADIOACTIVITY
Filed March 12, 1959     2 Sheets-Sheet 1

Oct. 3, 1961        F. MAYER        3,003,063
APPARATUS FOR MEASURING RADIOACTIVITY
Filed March 12, 1959        2 Sheets-Sheet 2

United States Patent Office 3,003,063
Patented Oct. 3, 1961

3,003,063
APPARATUS FOR MEASURING RADIOACTIVITY
Friedrich Mayer, Sarnen, Switzerland, assignor to G. A. Messen-Jaschin, Sarnen, Switzerland, a Swiss body corporate
Filed Mar. 12, 1959, Ser. No. 798,934
7 Claims. (Cl. 250—83)

This invention relates to apparatus for measuring the radioactivity of the air.

For measuring the radioactivity of the air, it is known to apply dust particles contained in the air of the room to be tested to a dust specimen support, which is thereafter introduced into a radiation measuring instrument, for example a scintillation counter, wherein the radioactivity is evaluated. Constructions are known in which a current of air is blown through a band which mechanically filters the air and serves as a dust specimen support. Constructions are also known in which the dust is electrostatically precipitated on dust carrier plates serving as precipitation electrodes. In the case of the mechanical filter, no really useful measurement is obtained by reason of the relatively low degree of separation, while in the case of the known electrostatic filter no continuous measurement is possible.

According to the present invention there is provided an apparatus for measuring the total amount of radioactivity of the air, comprising a separating chamber, means for causing a stream of air to be tested to flow through the chamber together with solid and liquid particles contained in the air, a separating electrode in the form of a band disposed partly within the chamber, means for driving the band so that it is fed longitudinally through the chamber parallel to the direction of the air stream, means for generating ions in the air stream and for providing in the chamber an electrical field, the direction of which is transverse to the direction of movement of the band, whereby the ions will impinge upon and charge said particles and the latter will be deposited on the band, and at least one measuring instrument located adjacent the band, beyond the chamber having regard to the direction of movement of the band, and adapted to measure the radioactivity of the particles deposited on the band.

The air stream may, if desired, be ionised in the chamber itself.

The separating chamber may conveniently be a duct of rectangular cross-section and the band may be guided along one side of the duct, in which case there may be provided near the opposite side of the duct, and extending along the duct, one or more discharge wires which serve both as ionising electrodes and as counter electrodes for producing the electrical field transverse to the direction of movement of the band. Two bands may be provided, on opposite sides of the duct, with the discharge wire or wires located centrally between them. Other features of preferred embodiments will become apparent hereinafter.

Figure 2:
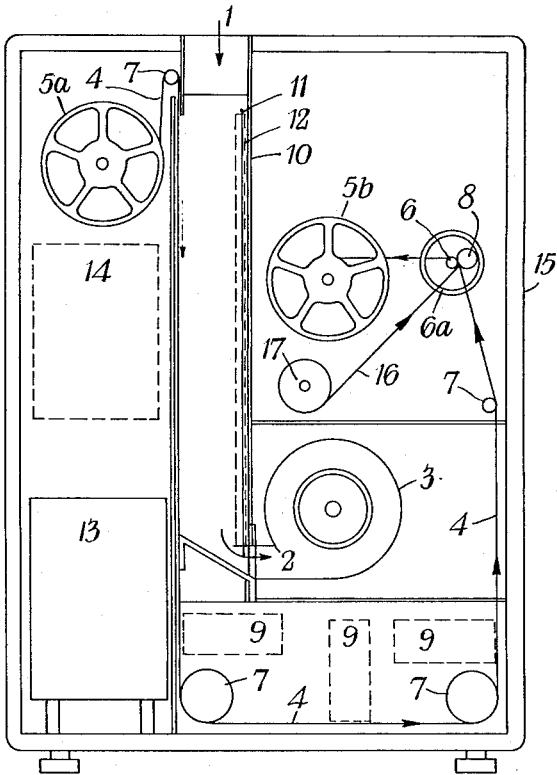
Figure 3:
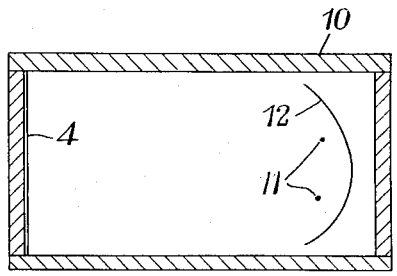
Figure 5:
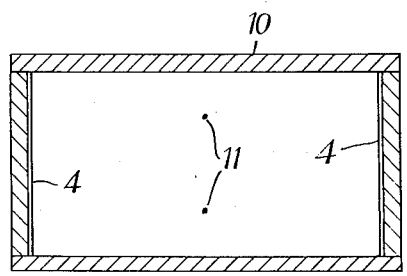
Figure 4:
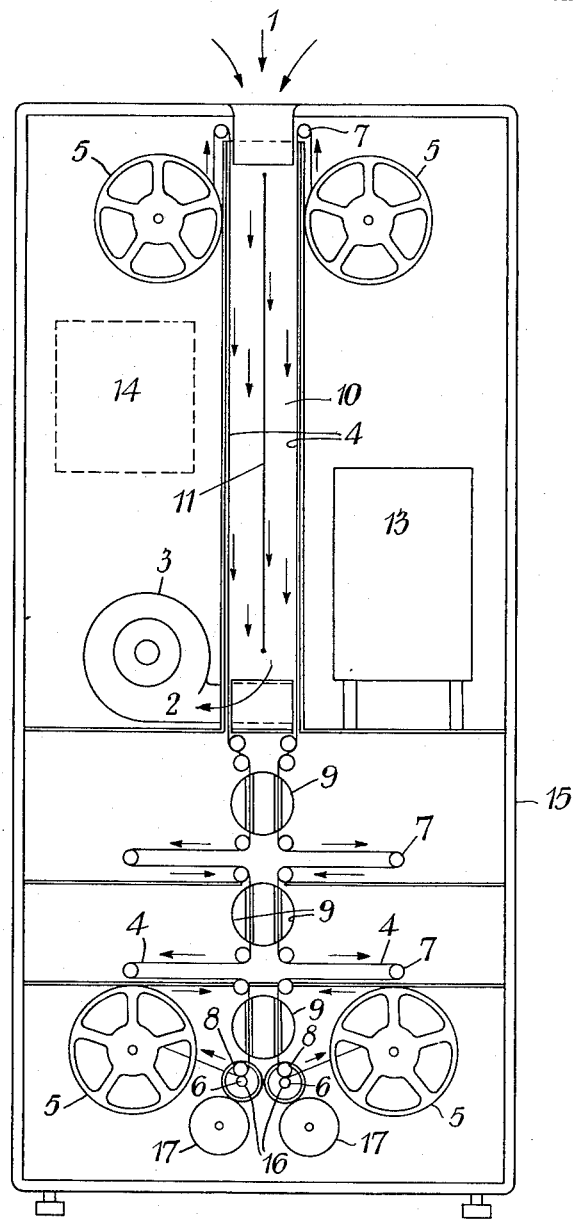

For a better understanding of the invention and to show how the same may be carried into effect, reference will now be made to the accompanying diagrammatic drawings in which:

FIGURE 1 shows a first example of apparatus for measuring the radioactivity of the air, the apparatus being shown in side elevation with a side wall of a housing for the apparatus removed, FIGURE 2 is a front elevation of the same example with a front wall of the housing removed, FIGURE 3 shows on a larger scale a cross-section through the deposition chamber of the example according to FIGURES 1 and 2, FIGURE 4 is an elevation similar to FIGURE 2 of a second example, and FIGURE 5 shows on a larger scale a cross-section through the deposition chamber of the example illustrated in FIGURE 4.

The apparatus according to FIGURES 1 to 3 comprises a housing 15 having an upper air inlet opening 1 which leads to an air passage 10 extending downwardly into the housing 15 and serving as a deposition chamber, the said air passage being of rectangular cross-section (see FIGURE 3). At the lower end of the passage 10 there is a lateral outlet 2 which leads to the suction side of a suction fan 3. A metallic band 4 is guided over the inside of one of the shorter walls of the said air passage 10, the said band travelling outside the air passage 10 from a first reel 5a by way of pulleys 7 and a driving pulley 6 to a second reel 5b. The pulley 6 is adapted to be driven by an electric motor 6a. In addition, a supply reel 17 for a covering band 16 is provided, which latter band also travels over the driving pulley 6 and is wound, together with the band 4, onto the reel 5b. A presser roller 8 serves to establish satisfactory contact between the band 4 and the covering band 16. Two taut electrical discharge wires 11 extending parallel to the axis of the air passage are disposed near the short side thereof which is opposite to the band 4. Alternatively, only one or more than two such wires could be provided. The band 4 is earthed and it functions as a deposition electrode, a sufficiently high potential difference being established between the band 4 and the discharge electrodes 11 to produce, on the one hand, a sufficient ionisation of the air current in the air passage 10 by corona discharges at the wires 11, and, on the other hand, a transverse electric field of such strength in the air passage 10 that the particles electrically charged by the ions generated in the passage 10 are attracted to and deposited on the band 4 within the passage 10. The walls of the air passage 10 consist of electrically insulating material. Disposed between the discharge electrodes 11 and the adjacent wall of the passage 10 is a metallic reflector 12 which is coextensive with the wires and which receives the same potential as the discharge wires and ensures that the particles charged in the air passage reach the opposite band 4. Instead of having a separate reflector, the wall of the deposition chamber shown to the right in FIGURE 3 could be constructed as a reflector, or the reflector might in some cases be omitted altogether. The necessary high voltage for the ioniser is supplied by a high-voltage source 13, the entire arrangement being operable from a switch panel 14. The band leaving the bottom of the air passage 10 is guided past three counting tubes 9 before encountering the covering band 16, which counting tubes record the radioactivity of the dust deposited on the band 4. The air freed from the dust leaves the arrangement by way of the outlet of the fan 3.

With the described arrangement, the measurement can be continuously carried out by reason of the fact that the band 4 is driven, and since the degree of separation of the electrostatic filter is considerably greater than that of the known mechanically acting blow-through filters, the measurement results are accordingly accurate.

FIGURES 4 and 5 illustrate apparatus in which two bands 4 are simultaneously guided along opposite sides of an air passage 10 serving as a deposition chamber. The discharge electrodes 11 are in this case stretched through the passage 10 mid-way between the two bands 4. No reflector is employed in this case. As will be seen from FIGURE 4, in addition to the air passage 10 with the discharge wires 11 and the fan 3, the counting tubes 9 sequentially arranged in relation to the deposition chamber 10 are also commonly associated with the two bands 4. On the other hand, the bands 4 are guided over separate reels 5a, 5b pulleys 7 and driving pulleys 6 and, after leaving the counting tubes 9, are each covered by a covering band 16 on the side carrying the deposited particles. The sensitivity of this arrangement can be substantially doubled as compared with that of the first-described example, so that the instrument can also be used to measure very small radioactivities in the air.

I claim:

1. Apparatus for measuring the total amount of radioactivity of the air, comprising a separating chamber, means for causing a stream of air to be tested to flow through the chamber together with solid and liquid particles contained in the air, a separating electrode in the form of a band disposed partly within the chamber, means for driving the band so that it is fed longitudinally through the chamber parallel to the direction of the air stream, means for generating ions in the air stream and for providing in the chamber an electrical field, the direction of which is transverse to the direction of movement of the band, whereby the ions will impinge upon and charge said particles and the latter will be deposited on the band, and at least one measuring instrument located adjacent the band, beyond the chamber having regard to the direction of movement of the band, and adapted to measure the radioactivity of the particles deposited on the band.

2. Apparatus for measuring the total amount of radioactivity of the air, comprising a duct, means for causing a stream of air to be tested to flow through the duct together with solid and liquid particles contained in the air, a separating electrode in the form of a band extending through the duct and projecting out of both ends thereof, means for driving the band so that it is fed longitudinally through the duct, a counter electrode within the duct and spaced from the band, means for applying a potential difference between the counter electrode and the band so that ions will be generated in the air stream and will impinge upon and charge said particles and the latter will be deposited on the band, and at least one measuring instrument located adjacent the band, beyond the duct having regard to the direction of movement of the band, and adapted to measure the radioactivity of the particles deposited on the band.

3. Apparatus according to claim 2, wherein the duct is of rectangular cross-section and means are provided to guide the band along one side of the duct, and wherein the counter electrode is constituted by a discharge wire extending along the duct, adjacent the opposite side thereof, and parallel to the band.

4. Apparatus according to claim 3, having a metallic ion-reflector disposed on that side of the wire which is remote from the band and also having means for applying a potential to said reflector.

5. Apparatus according to claim 4, wherein the reflector is constituted by a wall of the duct.

6. Apparatus according to claim 1 having a reel to receive the band after it has passed the measuring instrument, a covering band, and means for applying the covering band onto the first-mentioned band so that the particles thereon are covered and the two bands are wound together onto the reel.

7. Apparatus for measuring the total amount of radioactivity of the air, comprising a duct, two separating electrodes in the form of bands spaced apart and extending along the duct, means for causing a stream of air to be tested to flow through the duct between the two electrodes together with solid and liquid particles contained in the air, means for driving the bands so that they are fed in the same direction longitudinally through the duct, a wire counter electrode between the bands and extending parallel thereto, means for applying a potential difference between the counter electrode on the one hand and the bands on the other hand so that ions will be generated in the air stream and will impinge upon and charge said particles and the latter will be deposited on the bands, and at least one measuring instrument located adjacent the bands, beyond the duct having regard to the direction of movement of the bands, and adapted to measure the radioactivity of the particles deposited on both the bands.

References Cited in the file of this patent

UNITED STATES PATENTS 2,576,616     Livingston et al. _____ Nov. 27, 1951

OTHER REFERENCES

A Monitor for Low-Level Radioactivity in Liquid Streams, by Wingfield, E. C., et al., E. I. du Pont de Nemours & Co., Explosives Dept., Atomic Energy Div., Technical Div., Savannah River Laboratory, 14 pgs., 1956.